No. 884,248. PATENTED APR. 7, 1908.
B. P. WHITE.
COTTON CHOPPER.
APPLICATION FILED JUNE 27, 1907.

2 SHEETS—SHEET 1.

WITNESSES: Benjamin P. White, INVENTOR
By C. A. Snow & Co.
ATTORNEYS

No. 884,248. PATENTED APR. 7, 1908.
B. P. WHITE.
COTTON CHOPPER.
APPLICATION FILED JUNE 27, 1907.

2 SHEETS—SHEET 2.

WITNESSES: Benjamin P. White, INVENTOR.
By C. A. Snow & Co.
ATTORNEYS

UNITED STATES PATENT OFFICE.

BENJAMIN P. WHITE, OF STROUD, OKLAHOMA.

COTTON-CHOPPER.

No. 884,248.  Specification of Letters Patent.  Patented April 7, 1908.

Application filed June 27, 1907. Serial No. 381,078.

*To all whom it may concern:*

Be it known that I, BENJAMIN P. WHITE, a citizen of the United States, residing at Stroud, in the county of Lincoln and State of Oklahoma, have invented a new and useful Cotton-Chopper, of which the following is a specification.

This invention has relation to cotton choppers and it consists in the novel construction and arrangement of its parts as hereinafter shown and described.

The object of the invention is to provide a chopper of the character indicated which is of simple and durable construction and which will effectually remove surplus plants from a row.

The chopper consists primarily of a wheel mounted axle supporting a frame. A shaft is journaled in the frame and extends longitudinally of the implement. A disk is mounted upon the axle and is provided upon one side with a series of spaced gear segments a gear wheel is feathered upon the shaft and may be moved by a clutch lever longitudinally thereon, said gear wheel may be moved into the path of the said segments. A series of arms is mounted upon the shaft behind the frame of the implement and blades are carried by said arms. A block is swiveled to one end of the shaft and standards are pivoted to said block. Disks are journaled upon said standards, the forward disks being so positioned as to throw the earth away from the row and the rear disk to throw the earth toward the row. Lever mechanisms are provided for swinging the said standards in order that the blades may be caused to cut at a greater or less depth below the surface of the ground as desired.

Figure 1:
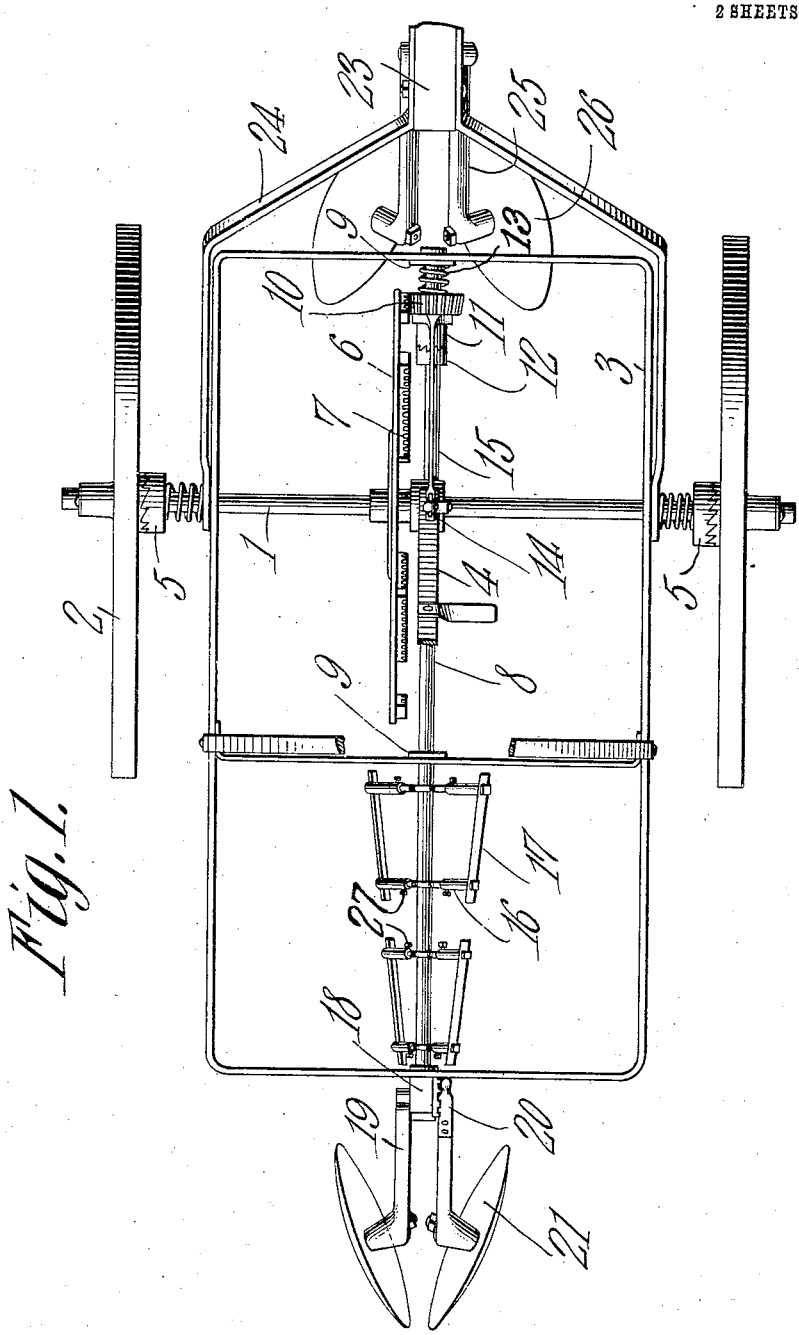
Figure 2:
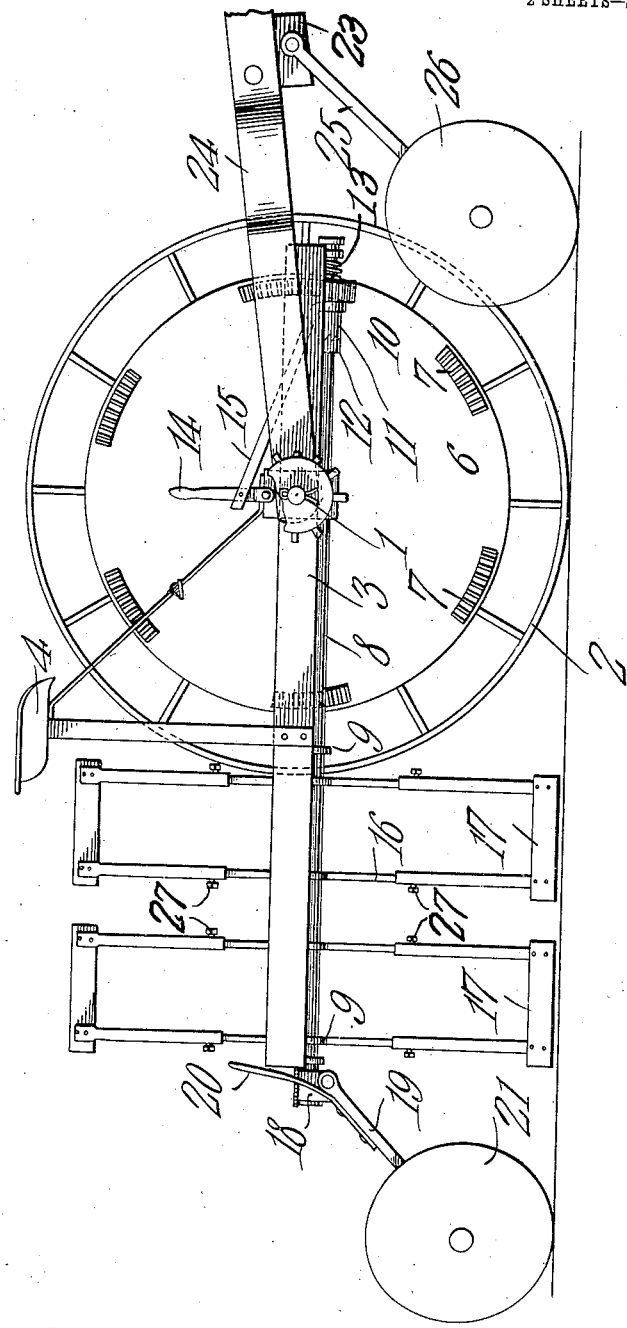

In the accompanying drawing:—Figure 1 is a top plan view of the cotton chopper, and Fig. 2 is a side elevation of the same with parts broken away.

The chopper consists of the axle 1 which is supported by the ground wheels 2. The frame 3 is mounted upon the axle 1 and is provided with an operator's seat 4. The spring pressed escapement collars 5 are located upon the axle 1 and are adapted to engage the hubs of the wheels 2 whereby the said axle is caused to rotate with the wheels when the implement is going forward but the axle may remain stationary when the implement is turning or being backed. The disk 6 is mounted upon the axle 1 and is provided upon one side with a series of appropriately spaced gear segments 7. The shaft 8 extends longitudinally of the implement and is journaled in suitable bearings 9 attached to the frame 3. The bevel gear wheel 10 is feathered on the shaft 8 and is provided with a clutch hub 11 which is adapted to engage the clutch member 12 fixed to the said shaft. The coil spring 13 surrounds the shaft 8 and bears at one end against the side of the frame 3, at its opposite end against the side of the gear wheel 10. Said spring is under tension to keep the hub 11 in engagement with the clutch member 12. The ratchet lever 14 is fulcrumed upon the implement and the link 15 connects the said lever with the gear wheel 10. By means of the said lever the said gear wheel may be manually moved longitudinally of the shaft 8 into the path of the segments 7 or beyond the same. The rear portion of the shaft 8 is provided with the radial arms 16 which are arranged in pairs and the outer extremities of each pair are connected together by a blade 17. The block 18 is swiveled upon the rear end of the shaft 8 and the upper ends of the standards 19 are pivoted to said block. The standards 19 are provided with a lever mechanism 20 whereby the said standards may be swung in alinement with the draft of the implement, thereby, adjusting the depth at which the blades 17 will operate in the ground as will hereinafter appear. The disks 21 are journaled at the lower ends of the standards 19 and are so disposed as to cast the earth toward the plants left remaining in the row after the surplus plants have been removed therefrom. The rear end of the tongue 23 is attached to the yoke 24 which in turn is pivoted to the shaft 1 and may swing independent of the frame 3. The standards 25 are pivoted at their upper ends to the tongue 23 and are provided at their lower ends with the disks 26 which are adapted to cast the earth away from the sides of the row of plants. The arms 16 are made up of telescopic sections with securing means, as bolts 27, whereby the distance at which the blades will work in the ground may be adjusted.

Having described my invention what I claim as new and desire to secure by Letters-Patent is:—

A cotton chopper comprising a frame mounted upon a wheel supported axle, a disk attached to the axle and having spaced gear segments on one side, a shaft journaled for rotation on the frame, a gear wheel located on the shaft for engagement with the gear segments, chopping blades carried by the shaft, a block swiveled to the shaft, standards pivoted to said block, a lever mechanism for adjusting the angles of inclination of the standards, and disks journaled upon the standards.

In testimony that I claim the foregoing as my own, I have hereto affixed my signature in the presence of two witnesses.

BENJAMIN P. WHITE.

Witnesses:
A. A. SEATON,
C. W. LYCOM.